(12) United States Patent
Calo et al.

(10) Patent No.: US 11,195,066 B2
(45) Date of Patent: Dec. 7, 2021

(54) AUTOMATIC PROTOCOL DISCOVERY USING TEXT ANALYTICS

(71) Applicant: International Business Machines Corporation, Armonk, NY (US)

(72) Inventors: Seraphin B. Calo, Cortlandt Manor, NY (US); Douglas M. Freimuth, New York, NY (US); Dilip D. Kandlur, San Jose, CA (US); Thai F. Le, White Plains, NY (US); Erich Nahum, New York, NY (US); Jorge J. Ortiz, New York, NY (US); Maroun Touma, Redding, CT (US); Dinesh C. Verma, New Castle, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 670 days.

(21) Appl. No.: 16/127,615

(22) Filed: Sep. 11, 2018

(65) Prior Publication Data

US 2020/0082231 A1    Mar. 12, 2020

(51) Int. Cl.
  *G06F 15/16* (2006.01)
  *G06K 9/72* (2006.01)
  (Continued)

(52) U.S. Cl.
  CPC ............. *G06K 9/72* (2013.01); *G06F 40/279* (2020.01); *G06K 9/6227* (2013.01); *G06N 20/00* (2019.01); *H04L 41/5058* (2013.01); *H04L 43/10* (2013.01); *H04L 67/12* (2013.01); *H04L 67/16* (2013.01); *H04W 4/70* (2018.02); *H04W 84/18* (2013.01)

(58) Field of Classification Search
  CPC ......... H04L 67/16; H04L 67/12; H04L 43/10; H04L 41/5058; H04W 84/18; H04W 4/70; G06K 9/72; G06K 9/6227; G06N 20/00; G06F 40/279
  See application file for complete search history.

(56) References Cited

U.S. PATENT DOCUMENTS 9,800,468 B2  10/2017  Smith et al.
9,830,166 B2  11/2017  Zhang et al.
(Continued)

OTHER PUBLICATIONS

Anonymous, "Websocket protocol name registry", Download Sep. 10, 2018, URL:<https://www.iana.org/assignments/websocket/websocket.xml>, 4 pages.
(Continued)

*Primary Examiner* — Oleg Survillo
(74) *Attorney, Agent, or Firm* — Cantor Colburn LLP; Joseph Petrokaitis

(57) ABSTRACT

A computing system for learning a device type and message formats used by a device is provided. The computing system includes an interface and a processor. The interface is receptive of documents describing identification information and communication and application protocols of devices. The processor is coupled with the interface to obtain rules of network packet analysis using document analytics and identify identification information and communication and application protocols of network messages from devices using the rules.

14 Claims, 11 Drawing Sheets

(51) Int. Cl.
    *G06K 9/62* (2006.01)
    *H04W 84/18* (2009.01)
    *H04L 12/26* (2006.01)
    *H04L 29/08* (2006.01)
    *H04W 4/70* (2018.01)
    *H04L 12/24* (2006.01)
    *G06N 20/00* (2019.01)
    *G06F 40/279* (2020.01)

(56) References Cited

U.S. PATENT DOCUMENTS

| | | |
|---|---|---|
| 9,846,577 B1 | 12/2017 | Riedl |
| 9,848,400 B2 | 12/2017 | Wang et al. |
| 9,853,826 B2 | 12/2017 | Shuman et al. |
| 9,860,677 B1 | 1/2018 | Agerstam et al. |
| 2017/0094592 A1 | 3/2017 | Tabatabaei |
| 2017/0126834 A1 | 5/2017 | Fransen |
| 2017/0149937 A1* | 5/2017 | Ren .......... H04W 4/70 |
| 2017/0208139 A1* | 7/2017 | Li .......... H04W 4/70 |
| 2017/0250879 A1 | 8/2017 | Chadha et al. |
| 2017/0374490 A1 | 12/2017 | Schoppmeier |

OTHER PUBLICATIONS

Gyrard et al., "Sensor-based Linked Open Rules (S-LOR): An Automated Rule Discovery Approach for IoT Applications and its use in Smart Cities", Proceeding WWW '17 Companion Proceedings of the 26th International Conference on World Wide Web Companion, Apr. 3-7, 2017, Perth, AU, pp. 1153-1159.

Meidan et al., "ProfilloT: A Machine Learning Approach for IoT Device Identification Based on Network Traffic Analysis", Proceeding SAC '17 Proceedings of the Symposium on Applied Computing, Apr. 3-7, 2017, NY, USA, pp. 506-509.

Miettinen et al., "IoT SENTINEL: Automated Device-Type Identification for Security Enforcement in IoT", 2017 IEEE 37th International Conference on Distributed Computing Systems (ICDCS), Jun. 5-8, 2017, GA, USA, 11 pages.

Mishra et al., "A Cognitive Adopted Framework for IoT Big-Data Management and Knowledge Discovery Prospective", International Journal of Distributed Sensor Networks vol. 2015, Article ID 718390, 12 pages.

* cited by examiner

The fields in the header are defined as follows:

Version (Ver): 2-bit unsigned integer. Indicates the CoAP version number. Implementations of this specification MUST set this field to 1 (01 binary). Other values are reserved for future versions. Messages with unknown version numbers MUST be silently ignored.

Type (T): 2-bit unsigned integer. Indicates if this message is of type Confirmable (0), Non-confirmable (1), Acknowledgement (2), or Reset (3). The semantics of these message types are defined in Section 4.

Token Length (TKL): 4-bit unsigned integer. Indicates the length of the variable-length Token field (0-8 bytes). Lengths 9-15 are reserved, MUST NOT be sent, and MUST be processed as a message format error.

Code: 8-bit unsigned integer, split into a 3-bit class (most significant bits) and a 5-bit detail (least significant bits), documented as "c.dd" where "c" is a digit from 0 to 7 for the 3-bit subfield and "dd" are two digits from 00 to 31 for the 5-bit subfield. The class can indicate a request (0), a success response (2), a client error response (4), or a server error response (5). (All other class values are reserved.) As a special case, Code 0.00 indicates an Empty message. In case of a request, the Code field indicates the Request Method; in case of a response, a Response Code. Possible values are maintained in the CoAP Code Registries (Section 12.1). The semantics of requests and responses are defined in section 5.

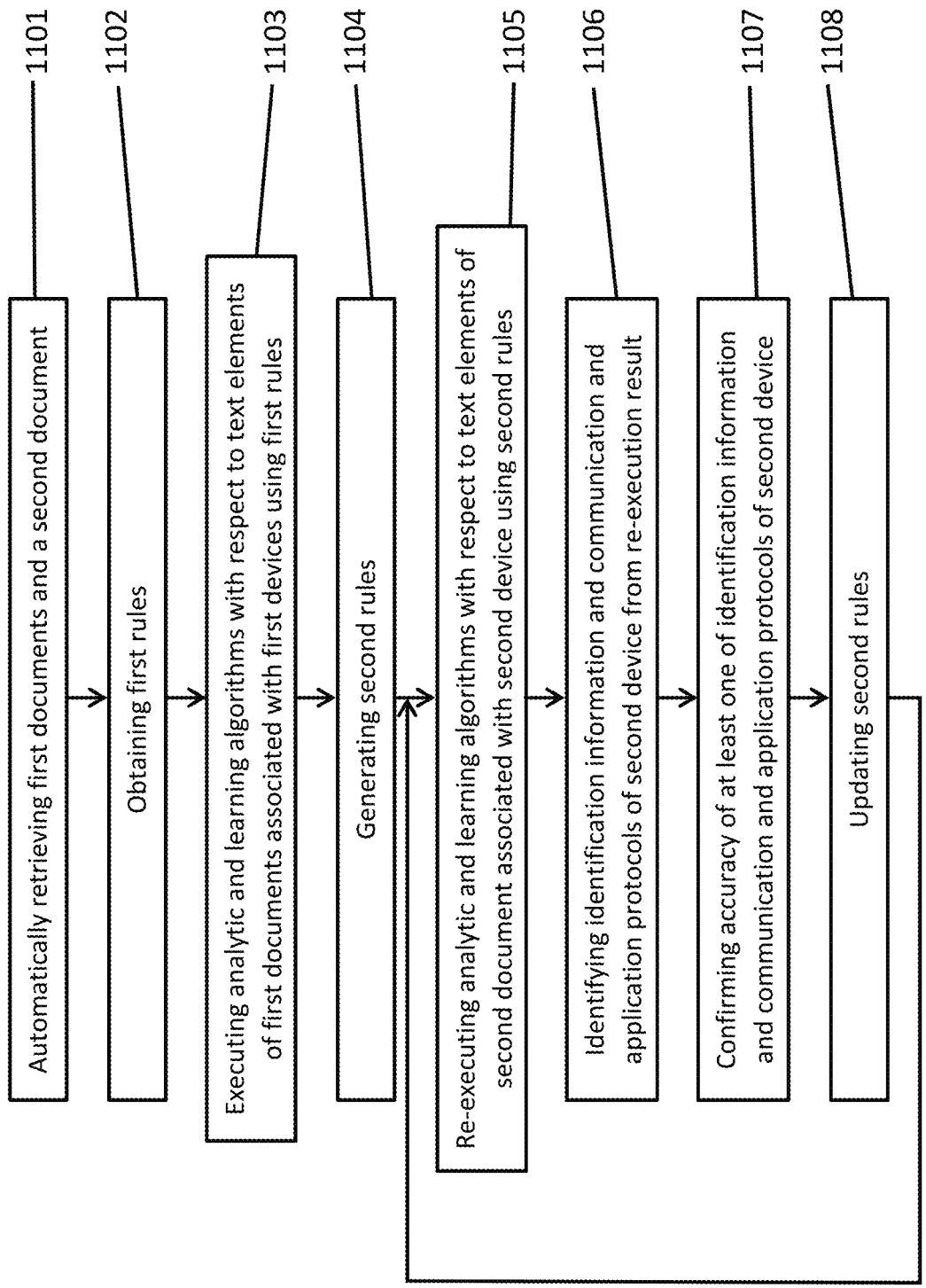

AUTOMATIC PROTOCOL DISCOVERY USING TEXT ANALYTICS

BACKGROUND

The present invention generally relates to protocol discovery, and more specifically, to an automatic method of protocol discovery in Internet of Things (IoT) environments using text analytics.

The IoT is a network of physical devices that includes standard connected devices and non-standard connected devices. The standard connected devices include, but are not limited to, portable and desktop computers, smartphones and tablets, etc. The non-standard devices include, but are not limited to, vehicles, home appliances and other items that are now being built with embedded electronics, software, sensors, actuators and connectivity. Such embedded electronics enables the non-standard devices to connect and exchange data with other standard and non-standard devices. The IoT thus creates opportunities for more direct integration of the physical world into computer-based systems, resulting in efficiency improvements, economic benefits and reduced human exertions.

SUMMARY

Embodiments of the present invention are directed to a computing system for learning a device type and message formats used by a device. A non-limiting example of the computing system includes an interface and a processor. The interface is receptive of documents describing identification information and communication and application protocols of devices. The processor is coupled with the interface to obtain rules of network packet analysis using document analytics and identify identification information and communication and application protocols of network messages from devices using the rules.

Embodiments of the present invention are directed to a computer-implemented method for learning device types and device message formats. A non-limiting example of the computer-implemented method includes obtaining rules of network packet analysis using document analytics and identifying identification information and communication and application protocols of network messages from devices using the rules.

Embodiments of the present invention are directed to a computer program product for learning device types and device message formats. A non-limiting example of the computer program product includes a processor and a memory having executable instructions stored thereon. When executed, the executable instructions cause the processor to execute a method. The method includes obtaining rules of network packet analysis using document analytics and identifying identification information and communication and application protocols of network messages from devices using the rules.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 is an exemplary textual protocol specific document in accordance with embodiments of the present invention;

FIG. 11 is a flow diagram illustrating a computer-implemented method for learning device types and device message formats in accordance with embodiments of the present invention.

Figure 1:
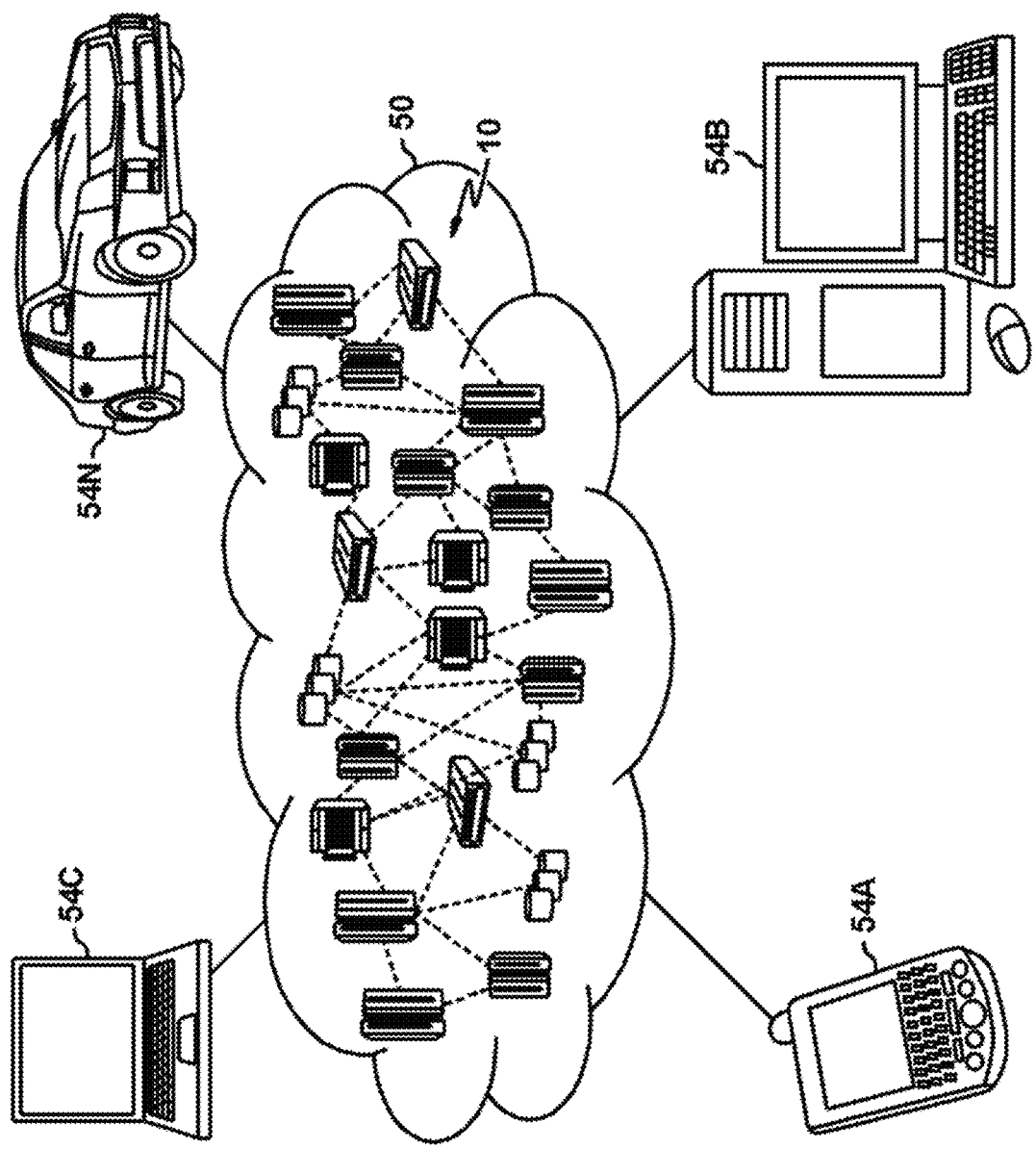
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
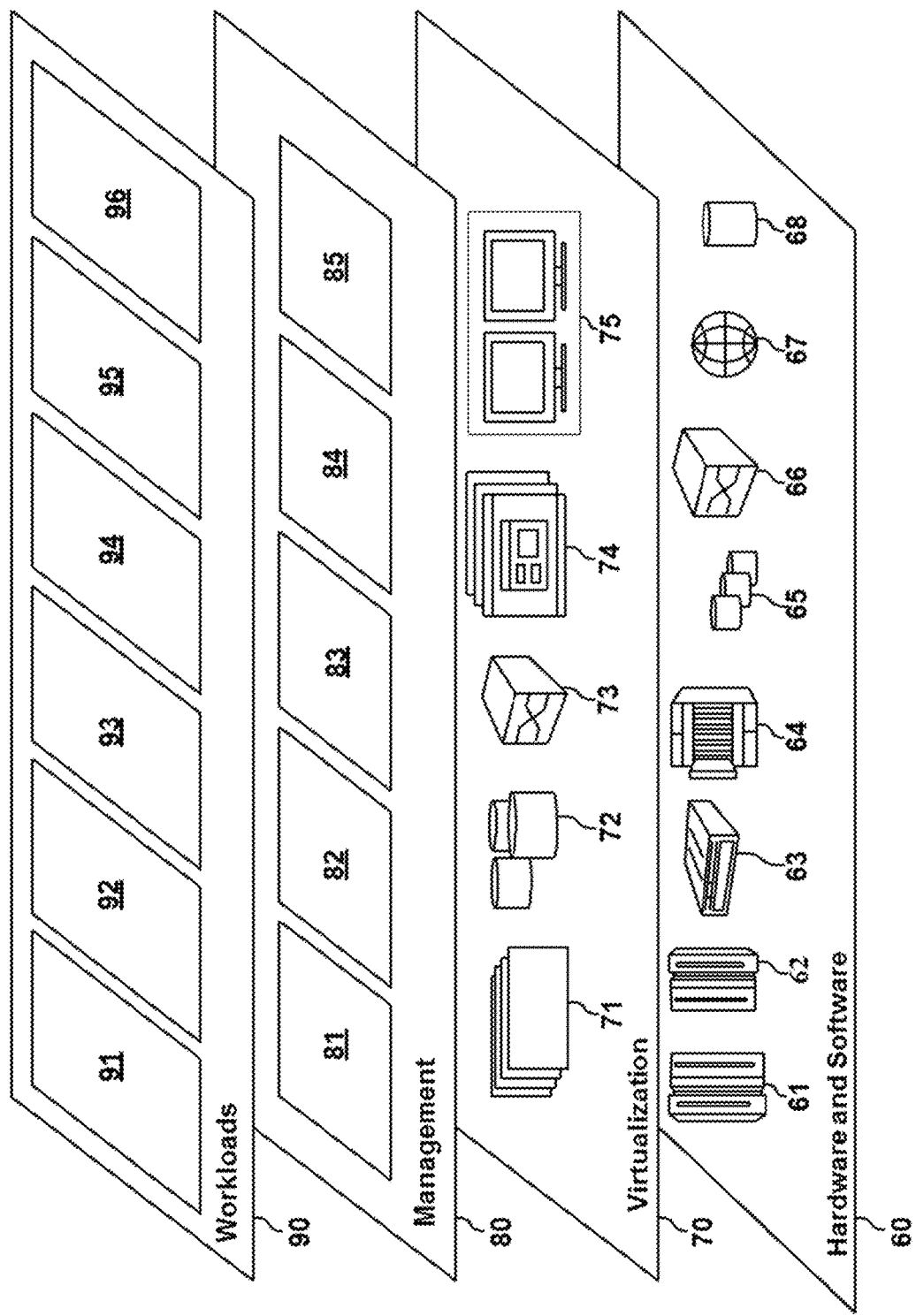
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic protocol discovery using text analytics 96.

Turning now to an overview of technologies that are more specifically relevant to aspects of the invention, application identification and device discovery are important tasks in the management and security of IT systems. These tasks are ever more critical in the realm of Internet-of-Things (IoT) as the variety of devices and the applications that use them are growing very rapidly.

While the IoT connects different devices to a cloud platform, it is to be understood that the devices can include controllers for light-bulbs, thermostats, industrial robots, microphones, cameras, pollution sensors, light-bulbs, locomotive engines, etc. One of the functions that needs to be performed in such environments is the discovery of devices that are communicating, along with the attributes of the discovered devices. Such discovery is useful to many tasks in an IoT environment, including the task of identifying misbehaving devices, making an inventory of devices in an environment, automatically registering devices into an asset registration system, running problem diagnostics on the devices, etc. In order to perform the discovery process, one needs to understand which communication protocols are being used by the devices to communicate, use rules to extract fields being exchanged in the communication protocol and then use other rules to determine the list of devices and device attributes that are being used for communication. The task of identifying protocols and specifically extracting fields from the traffic collected on the system is protocol discovery.

Current protocol discovery systems tend to rely on human generated rules and decoders that are applied to communications traffic between entities to identify devices and applications to interpret the communication protocol and extract the information being exchanged among them. The process of creation of rules and custom decoders is labor intensive and gates how quickly new devices and applications can be identified. This can result in significant visibility gaps in IoT management.

Practitioners, such as system programmers, use a variety of existing tooling to identify protocols. Such tools generally fall into three classes of capabilities, namely Network Protocol Analyzers, Intrusion Detection Systems (IDS), Intrusion Prevention Systems (IPS), and Streams processors. A popular open source network protocol analyzer can be useful for debugging network problems and for debugging newly developed network code. Popular IDS/IPS systems operate on protocol parsing and rules based methods and can be extended with rules describing the new protocol to inspect. Finally, Streams processors can process a stream of data from internet including processing the network protocol in a pipeline of functions. These tools all depend on human generated rules and processes to decode an IoT network protocol stream.

Figure 3:
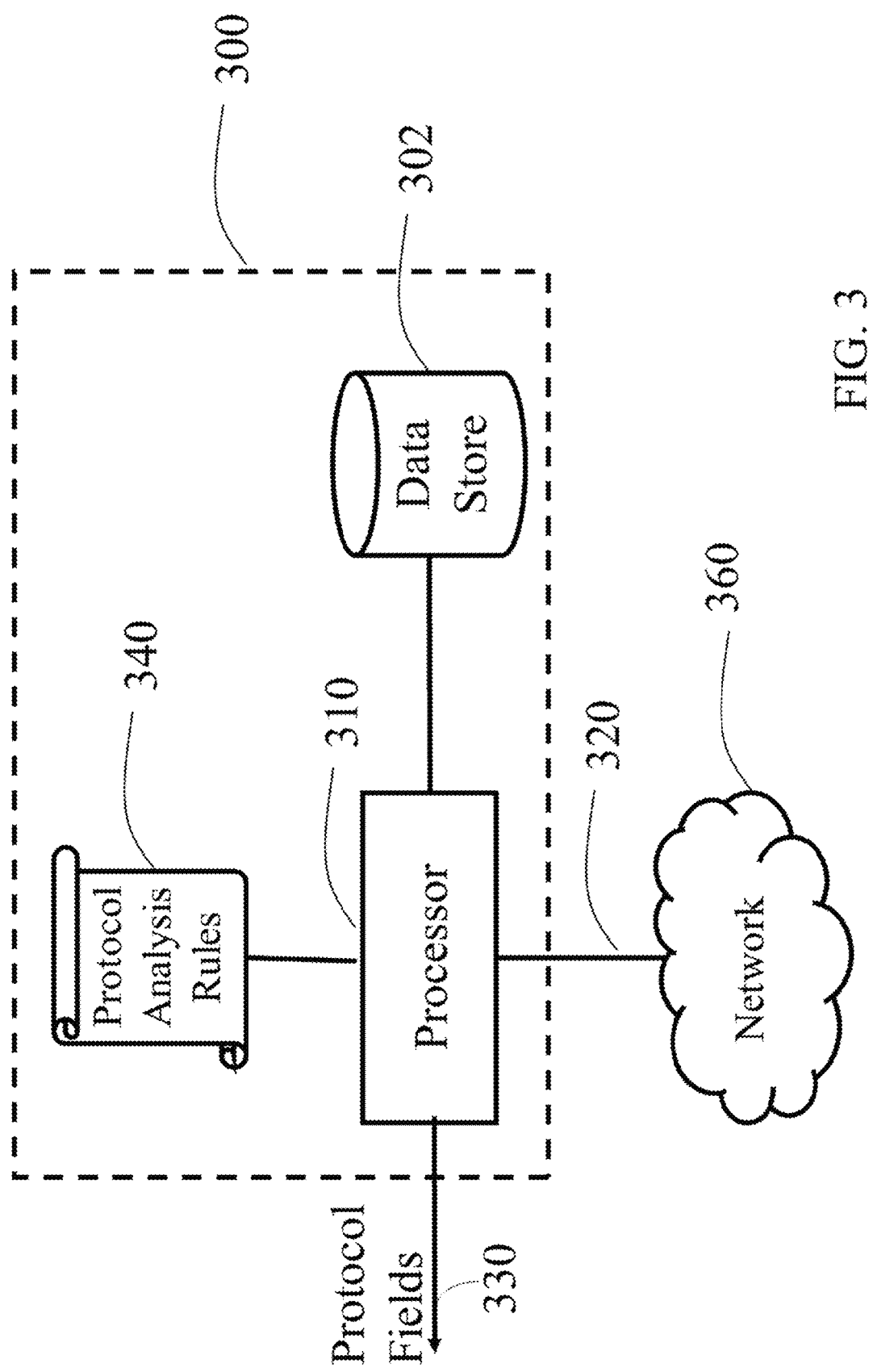
FIG. 3 is a schematic illustration of a computing system for protocol discovery in accordance with embodiments of the present invention.

With reference to FIG. 3, a protocol discovery system 300 is provided and is configured to convert a set of network packets collected over an interface 320 from a network 360 into a set of protocol fields on an output interface 330. As shown in FIG. 3, the protocol discovery system 300 includes a data store 302, the network interface 320, a rule processor 310, the output interface 330 and a set of protocol analysis rules 340. The data store 302 can include or be provided as a memory and has executable instructions stored thereon, which are readable and executable by rule processor 310. When the executable instructions are read and executed by the rule processor 310, the executable instructions cause the rule processor 310 to collect network packets from the network 360 over the network interface 320, to retrieve the set of protocol analysis rules 340 and generate a set of protocol fields on the output interface 330. The protocol analysis rules 340 can be stored in the data store 302 or can be stored in another memory. The protocol analysis rules 340 can be specified in a variety of forms depending on the nature of the tool. That is, they can be specified as a set of if-then-else statements, as a set of functions to be invoked on certain fields, defined as a parser from which fields are to be extracted, or be encoded in program specific configuration commands.

The output interface 330 can include or be provided as a set of records that are stored in another database, a set of messages that are sent to a software system processor, a set of files that are stored on a computer storage medium, or a graphical user interface (GUI) that is displayed on a display element of a computing device to one or more users.

The protocol discovery system 300 can be coupled to other systems which do tasks like creating an inventory of devices in the network, or checking for violations of security guidelines within an enterprise.

A net effect of the protocol discovery system 300 is that a stream of network packets, which would be encoded as a sequence of binary bits, are taken and converted into a set of protocol fields. Thus, a discovery engine may convert the set of packets into a sequence of attribute value pairs. Similar parsing of protocol fields can be converted for other protocols and other fields.

As mentioned above, a creation of the protocol analysis rules 340 can be done with human input, which is labor intensive and gates the development and update of protocol discovery mechanisms. As new communication protocols are defined and used, however, the creation of protocol analysis rules in a manual manner becomes more difficult and time consuming whereas an automatic protocol discovery system can be built using text analytics which can eliminate the task of writing such rules manually.

Turning now to an overview of the aspects of the invention, one or more embodiments of the invention address the above-described shortcomings of the prior art by applying text analytics and machine learning to documents describing devices, device communications and application protocols. This will be used to automatically generate the rules and decoders for new devices and applications, to be used by discovery systems to recognize these new entities.

The above-described aspects of the invention address the shortcomings of the prior art by using a directed learning system to automatically generate classifiers for new IoT protocols using text analysis and machine learning. Input protocol documents can include, but are not limited to, text versions of protocol specifications, pdf versions of protocol specifications and specifications in other file formats. In some embodiments, the set of available input protocol documents can be extended with automatic crawlers, programs which find out such specifications on the Internet and the World Wide Web. Outputs can include, but are not limited to, extractions of protocol fields, meta-data that can be used to extend discovery capabilities, such as new classifiers, to detect new protocols.

Figure 4:
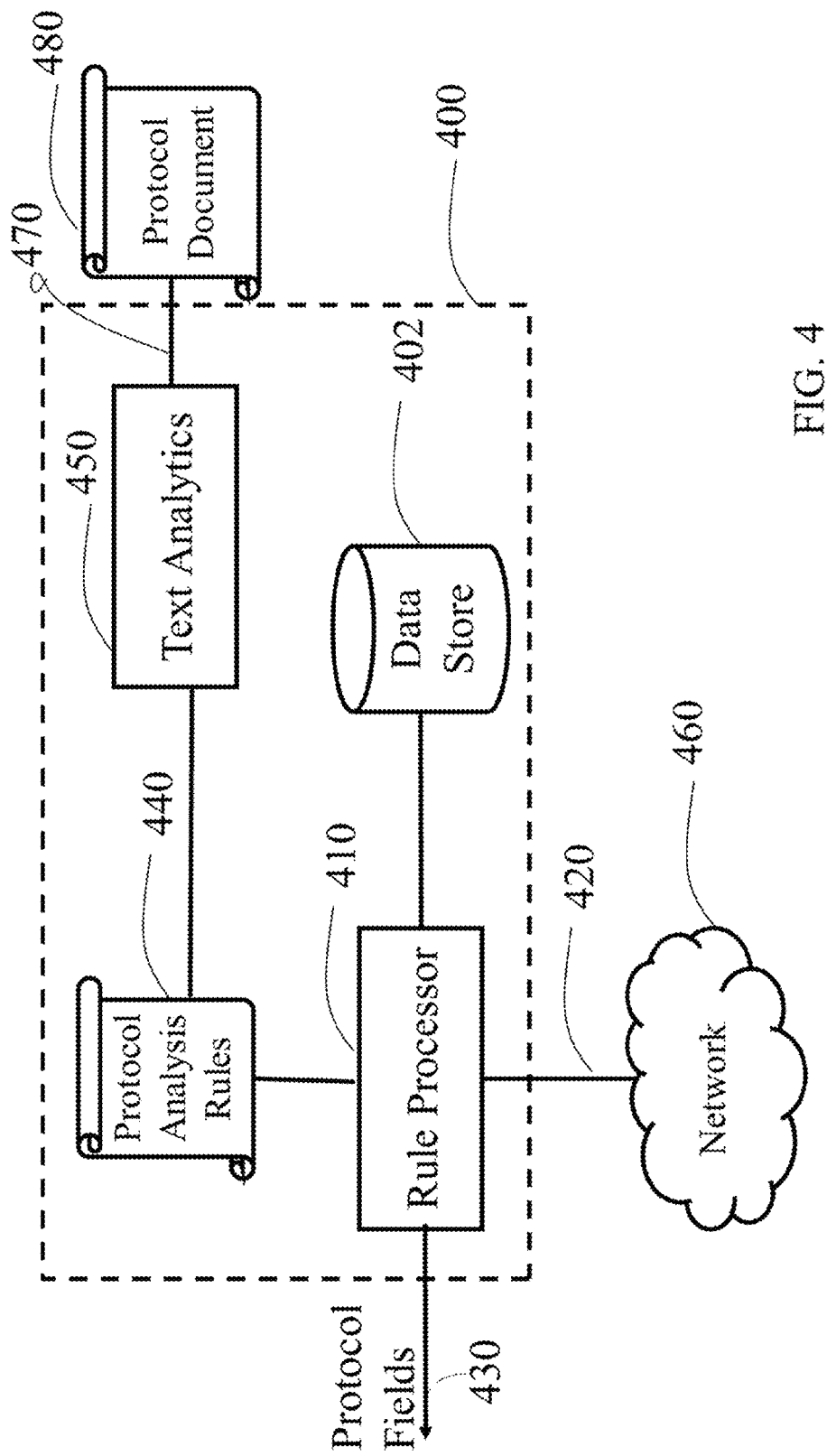
FIG. 4 is a schematic illustration of a computing system for automatic protocol discovery using text analytics in accordance with the embodiments of the present invention.

Turning now to a more detailed description of aspects of the present invention, FIG. 4 depicts a computing system 400 for automated protocol discovery using text analytics. The computing system 400 is capable of ingesting network packets, assembling related packets into message flows and using a protocol document to decode those flows into a set of protocol fields. The computing system 400 uses a variety of techniques (e.g., document processing algorithms) to convert the input protocol document into a set of protocol analysis rules and to use those rules to convert network packets into the extracted protocol fields.

As shown in FIG. 4, the computing system 400 includes a data store 402, a rule processor 410, a network interface 420, an output interface 430, protocol analysis rules 440, text analytics 450, a network with which the network interface 420 is communicative and a reading interface 470. The data store 402 can include or be provided as a memory and has executable instructions stored thereon, which are readable and executable by the rule processor 410. When the executable instructions are read and executed by the rule processor 410, the executable instructions cause the rule processor 410 to ingest network packets from the network interface 420 and to produce protocol fields on the output interface 430 using the protocol analysis rules 440. The protocol analysis rules 440 are produced by the text analytics 450 which reads in protocol documents 480 using the reading interface 470 and converts them into a set of protocol analysis rules 440.

The text analytics 450 can be constructed in a variety of configurations. The text analytics 450 can be effectively coupled with the reading interface 470 and configured to generate the protocol analysis rules 440. The text analytics 450 can generate the protocol analysis rules 440 by using a natural language parser. The protocol analysis rules 440 can be stored locally in the data store 402 or remotely in a network (e.g., the Internet) to which the network interface 420 is connected. In some embodiments of the present application, the text analytics 450 can be run in the cloud (see FIG. 2). In other embodiments, the text analytics 450 can run on a local processor.

Figure 5:
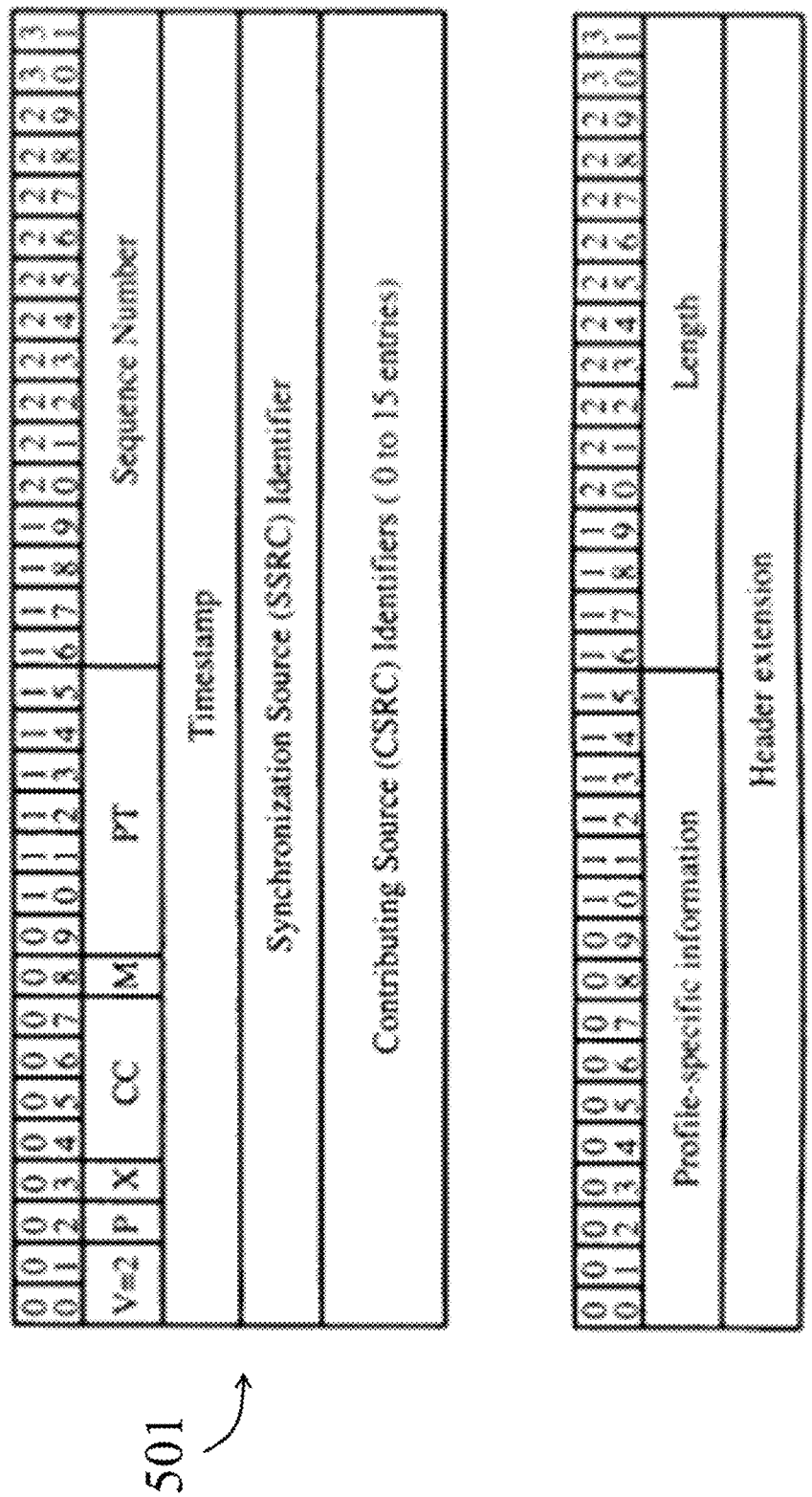
FIG. 5 is a graphical depiction of different types of exemplary text documents that can be used as the input for automated discovery using text analytics in accordance with embodiments of the present invention.

With reference to FIG. 5, an exemplary implementation of the text analytics 450 can be applied to an image of a protocol document 501 that includes a description of a Real Time Protocol (RTP). The image can be scanned using technologies like Optical Character Recognition (OCR) and mapped into the protocol analysis rules 440 that define where specific header fields can be found in the network packet.

That is, from the image, the first row of characters can be used to determine bit locations of different fields in the protocol headers and the second row of characters lists names of the fields in an RTP header. By analyzing the text resulting from the OCR process, the text analytics 450 can generate rules such as: the first two bits in the network traffic of RTP form a V field; the $32^{nd}$ bit to $63^{rd}$ bit form a time-stamp, etc. This information can be mapped into the protocol analysis rules 440. From any network packet information, after determining that the network packet is a RTP packet, the protocol analysis rules 440 can be used by the rule processor 410 to convert the network packet information into fields of the RTP protocol.

Figure 6:
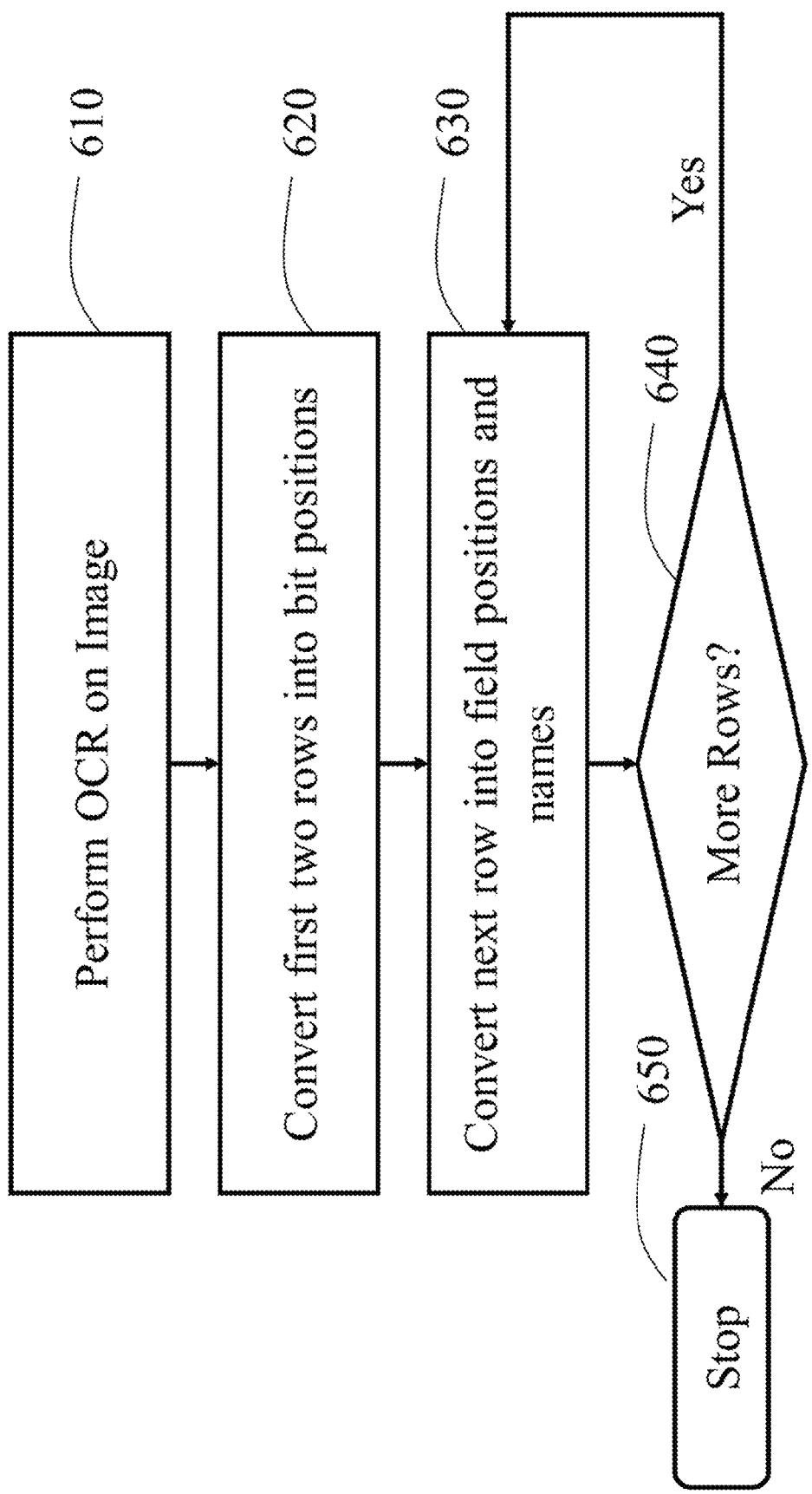
FIG. 6 is a flow diagram illustrating a computer-implemented method for learning device types and device message formats in accordance with embodiments of the present invention.

With reference to FIG. 6, algorithmic operations required to map the image like the one shown in FIG. 5 to a set of protocol analysis rules 440 are provided. As shown in FIG.

6, OCR is applied to the image in operation 610. This presents the different characters in rows with positions in columns. The first two rows are then converted into bit positions of the packet header in operation 620. In operation 630, a next row of characters is examined, and from their position in the image, the row is converted to the names of the fields and their location in the packet header. This is converted into a rule for extracting the fields named in that row. Then, in operation 640, the computing system 400 checks to see if more unprocessed rows remain. If there are, operation 630 is repeated. Otherwise, the process stops in operation 650.

While the illustrative flow diagram of FIG. 6 illustrates that a conversion uses optical character recognition and text analysis of an image, it is to be understood that other embodiments can implement variations depending on the type of the image. For example, the contents of only a first row of an image may indicate the position of the fields instead of the contents of first two rows and, instead of lines marking the ends of fields, other diagrams may indicate that feature using arrows. These differences can be accommodated by defining the appropriate conversions of the output of the OCR to a set of protocol analysis rules 440 for processing network traffic to create protocol headers.

Figure 7:
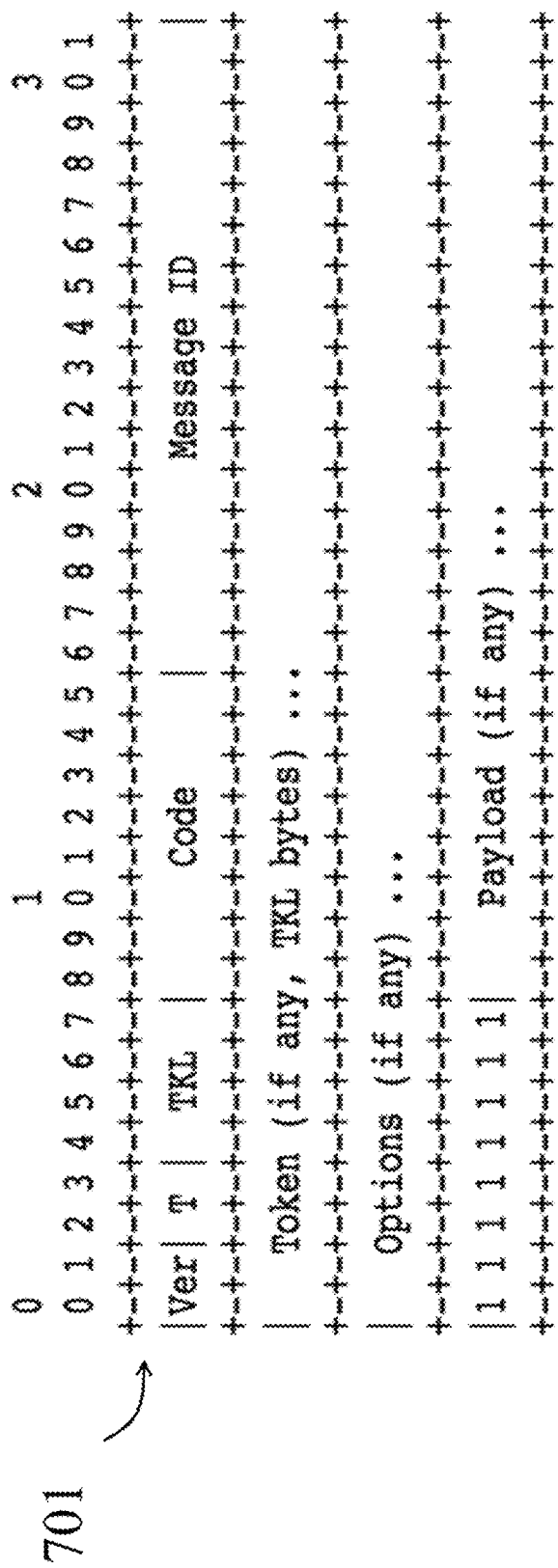
FIG. 7 is a schematic illustration of a computing system for protocol discovery with automated search for learning device types and device message formats in accordance with embodiments of the present invention.

With reference to FIG. 7, the specification of the protocol may not be made in a diagram in some protocol specification documents but by using diagrams using character recognition. This style for specifying protocols is commonly used in Internet request for comments. These requests include specifications for several protocols including the Constrained Application Protocol (CoAP). Here, instead of using image representations, field positions are shown using ASCII representations of the locations. In this case, the algorithm of FIG. 6 can still be used, but the first OCR operation is not needed. In the position determining operations, the first two rows are used to map their contents into bit locations ranging from 00 to 31.

With reference to FIG. 8, documents like the one defining CoAP identified in FIG. 7 and the accompanying text can also include text descriptions about the fields that are included in the protocol. For example, such an excerpt of a textual protocol specific document 801 is used to describe the fields as shown in FIG. 8. A text processing document can convert the text description into the mapping for the network packet contents into the name of the fields and their value. By examining the textual descriptions, one can observe that the text descriptions follow some very well-defined conventions. The text field is identified with a semi-colon, which is followed by its length, and then indicates keywords defining what the meaning of the field is. The field can thus be extracted by following the patterns that are defined by the natural language.

In accordance with embodiments and with reference to FIGS. 5, 7 and 8, the first documents can include at least one of the protocol document 501, a character-image protocol specification document 701 (see FIG. 7) and the textual protocol specific document 801. In these or other cases, the analytic algorithm can include or be provided as a document processing algorithm that is configured or designed for extracting information from one or more portions of a document (i.e., the protocol document 501, the character-image protocol specification document 701 and the textual protocol specific document 801). The approach for extracting information can be defined.

Such systems can be very effective in generating rules for protocol processing. As an illustrative example, there can be more than eight-thousand documents available as standards defining several hundred protocols in a certain case. These documents all follow the convention of illustrating protocol headers and formats as described in FIGS. 7 and 8. A text analytics module such as the text analytics 450, which is defined using natural language processing, can create the required protocol analysis rules 440 shown in FIG. 4 automatically and without requiring manual definitions of those rules. Similarly, several header extraction formats for different types of files can be defined at a certain location and processing of the information from that location could automatically generate hundreds of rules.

Modern natural language processing (NLP) algorithms are often based on machine learning concepts. The paradigm of machine learning is different from that of most prior attempts at language processing. Prior implementations of language-processing tasks typically involved the direct hand coding of large sets of rules. The machine-learning paradigm calls instead for using general learning algorithms that are often, although not always, grounded in statistical inference to automatically learn such rules through the analysis of large sets of documents or individual annotated sentences of typical real-world examples.

Many different classes of machine learning algorithms have been applied to NLP tasks. These algorithms typically take as input a large set of "features" that are generated from the input data. Some of the earliest-used algorithms, such as decision trees, produced systems of hard if-then rules similar to the systems of hand-written rules that were then common. Increasingly, however, research has focused on statistical models, which make soft, probabilistic decisions based on attaching real-valued weights to each input feature. Such models have the advantage that they can express the relative certainty of many different possible answers rather than only one, producing more reliable results when such a model is included as a component of a larger system.

Systems that are based on machine-learning algorithms have many advantages over hand-produced rules. The learning procedures used during machine learning automatically focus on the most common cases, whereas when writing rules by hand it is often not at all obvious where the effort should be directed. Automatic learning procedures can make use of statistical inference algorithms to produce models that are robust to unfamiliar input (e.g. containing words or structures that have not been seen before) and to erroneous input (e.g. with misspelled words or words accidentally omitted). Generally, handling such input gracefully with hand-written rules or, more generally, creating systems of hand-written rules that make soft decisions is extremely difficult, error-prone and time-consuming.

Systems based on automatically learning the rules can be made more accurate simply by supplying more input data. However, systems based on hand-written rules can only be made more accurate by increasing the complexity of the rules, which is a much more difficult task. In particular, there is a limit to the complexity of systems based on hand-crafted rules, beyond which the systems become more and more unmanageable. However, creating more data to input to machine-learning systems simply requires a corresponding increase in the number of man-hours worked, generally without significant increases in the complexity of the annotation process.

Turning to a specific embodiment, the text analytics 450 (see FIG. 4) of the computing system 400 can be generated using machine learning algorithms. Using this approach, the text analytics 450 might not be hard-coded but rather supplied with several different types of documents along with the representative protocol analysis rules. A text analytics generator can use the corpus of protocol document specifications and the set of corresponding protocol analysis rules 440 to generate the text analytics 450 that can apply to the set of larger number of documents.

Figure 9:
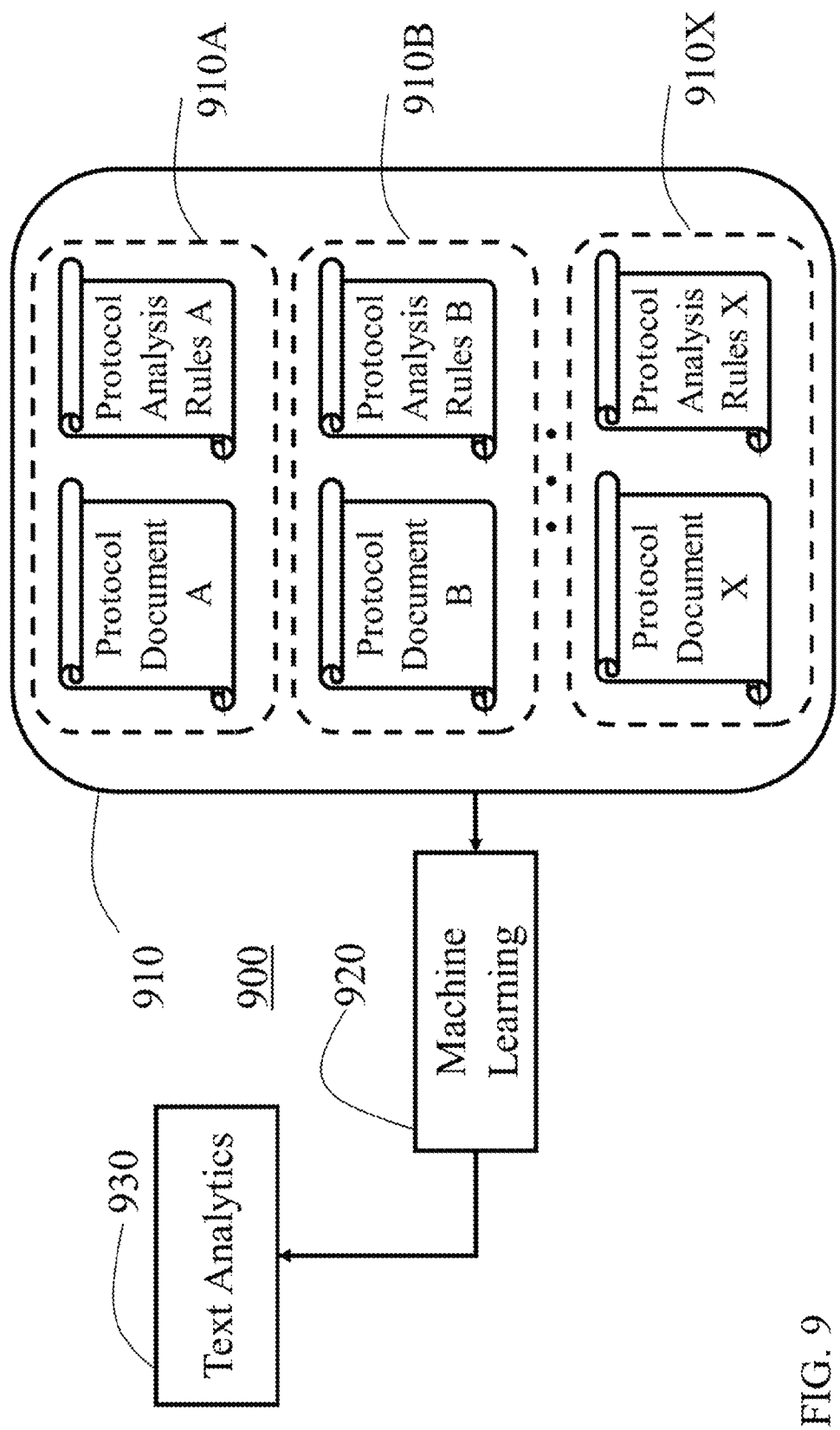
FIG. 9 is a schematic diagram of a text analytics component generator in accordance with embodiments.

With reference to FIG. 9, a text analytics component generator 900 is provided. The text analytics component generator 900 uses a corpus of training documents 910 that includes several pairs of text documents describing a protocol and the corresponding protocol analysis rules shown as pairs 910A, 910B and 910X respectively. A machine learning component 920 examines the patterns in these documents and uses them to generate a text analysis component 930 automatically. That text analytics component 930 can then be used in lieu of the text analytics 450 in the computing system 400.

As an instance of this approach, it will be assumed that both the protocol document 480 and the protocol analysis rules 440 of FIG. 4 are known for some common protocols such as the Transmission Control Protocol (TCP), Dynamic Host Configuration Protocol (DHCP), Hyper Text Transfer Protocol (HTTP), Simple Mail Transfer Protocol (SMTP), etc. Their document descriptions are available and the corresponding protocol analysis rules 440 are known and implemented in many systems. These could be used as part of the corpus of the training document 910 of FIG. 9. The resulting machine learning model would create a text analysis component which can provide a way to create protocol analysis rules for a protocol like CoAP where the rules do not already exist.

The machine learning component 920 can use a variety of algorithms which are trained from the corpus of the training documents. These include, but are not limited, to creating a neural network for conversion of text into rules, automatically converting an ontology that could translate text into rules, automatically determining patterns for converting text documents into rules, selecting from a plurality of existing models for document training, using transfer learning to modify and existing model for conversion, etc. In some cases, where the structure of a first document follows closely the structure of a second document, a first set of rules corresponding to the first document can be adopted into a second set of rule corresponding to the second document, as described in FIGS. 10 and 11.

Figure 10:
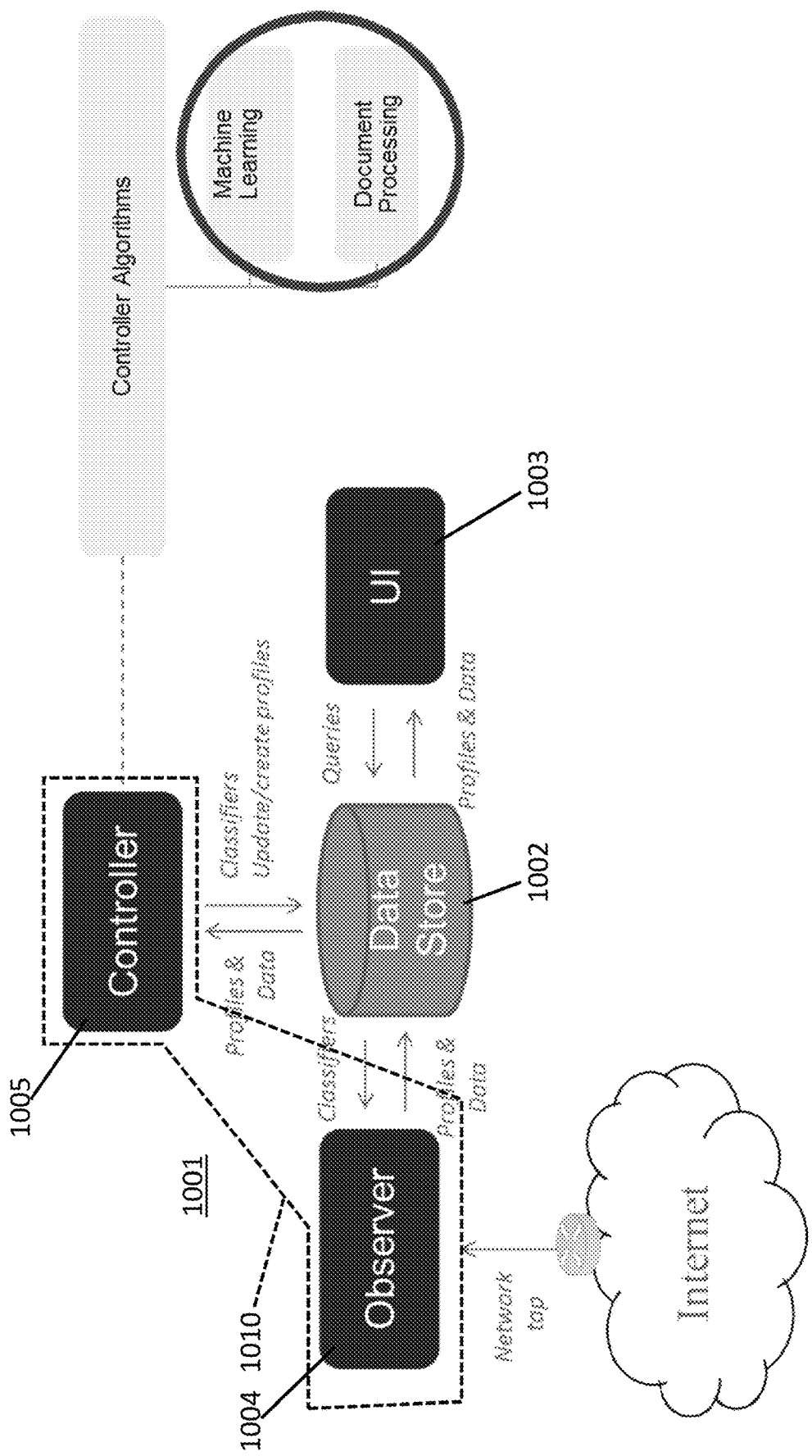
FIG. 10 is a schematic illustrating of a computing system in accordance with embodiments of the present invention.

Turning now to a detailed description of additional aspects of the present invention, FIG. 10 depicts a computing system 1001 for automated learning of a device type and message formats used by a device. Computing system 1001 is a possible alternative embodiment for the system shown in FIG. 3. The computing system 1001 is capable of ingesting network packets, assembling related packets into message flows and using pre-built classifier rules to decode those flows, identifying devices and applications participating in the message flows and creating a meta-data profile for the message flows with the identification information. The computing system 1001 is also capable of using a variety of techniques (e.g., machine learning and document processing algorithms) to create and make available new classifier rules.

As shown in FIG. 10, the computing system 1001 includes a data store 1002, an interface 1003, a network connection 1004 and a controller 1005. The data store 1002 can include or be provided as a memory and has executable instructions stored thereon, which are readable and executable by a processor 1010. When the executable instructions are read and executed by the processor 1010, the executable instructions cause the processor 1010 to operate in part as the network connection 1004 and the controller 1005 and to generate the interface 1003 for display to and interaction with one or more users.

In particular, the interface 1003 can include or be provided as a graphical user interface (GUI) that is displayed on a display element of a computing device to one or more users. In any case, the interface 1003 is receptive of first documents, which describe identification information and communication and application protocols of first devices, at an initial time and is receptive of a second document of a second device at a later time.

The processor 1010 is effectively coupled with the interface 1003 and configured to obtain first rules of document analytics and machine learning via the network connection 1004. The first rules can be stored locally in the data store 1002 or remotely in a network (e.g., the Internet) to which the network connection 304 is connected. By way of the controller 1005, the processor 1010 is further configured to execute analytic and learning algorithms with respect to text elements of the first documents using the first rules, to automatically generate second rules for the first documents between the initial and later times from execution results, to re-execute the analytic and learning algorithms with respect to text elements of the second document using the second rules and to identify identification information and communication and application protocols of the second device from re-execution results. In some embodiments of the present application, the processor 1005 can be further configured to update the second rules in an event at least one of the identification information and communication and application protocols are unconfirmed.

In accordance with embodiments, the first documents can include at least one of documents including the description of a mail document, the description of the CoAP message structure, or the description of a web of things. In these or other cases, the analytic algorithm can include or be provided as a document processing algorithm that is configured or designed for extracting information from one or more portions of a document (i.e., the mail document, the documents in the CoAP format and the documents in the web of things specification). Similarly, in these or other cases, the learning algorithm can include or be provided as a context processing algorithm for recognizing contextual information of a document (i.e., the mail document, the documents in the CoAP format and the documents in the CoAP message format).

Thus, to an extent first rules of document analytics and machine learning exist and dictate that certain specific types of information can be found in a document header and a table inserted within the document, the analytic algorithm can be applied to text elements of the mail document to extract specific sending device information from the mail document header and the thermostat readings from a table in the mail document body. At a same time, to the extent the first rules exist and dictate that certain contextual information can be found in a document body, the learning algorithm can be applied to the text elements of the mail document to extract contextual information, such as the name of the thermostat reporting the reading and its possible building location from the mail document body.

In this way, where the mail document is defined as a first document for a first device (i.e., the mail server from which the mail document originates to provide readings of a building thermostat) and where other similar documents have similar formats, the controller 1005 can automatically generate second rules for the first document(s) between the initial and later times from results of the execution of the analytic and learning algorithms. Here, the second rules function are essentially updated versions of the first rules or as meta-rules or meta-profiles. The controller 1005 can then re-execute the analytic and learning algorithms with respect to text elements of the second document, such as a mail document to provide readings of a building light controller, using the second rules and can potentially identify identification information and communication and application protocols of the second device from re-execution results. That is, the controller 1005 can look toward the header of the second document and any tables in the body of the second document for specific information and to the body of the second document for contextual information.

To an extent the specific and contextual information is found, the controller 1005 can identify the second document as an email document. Moreover, to an extent the specific and contextual information suggest that the email document provides the recipient with light-bulb readings for the light fixtures, the controller 1005 can identify that the new mail server uses a similar format as the mail server for providing thermostat readings. Conversely, to an extent that the header, the body and inserted tables in the second document do not share features with the mail document, the controller 1005 can reevaluate and update the second rules and iteratively repeat the processes described above.

Similar analysis and processing can be applied with respect to the documents describing the CoAP format and the documents in the CoAP message format.

With reference to FIG. 11, a computer-implemented method for learning device types and device message formats is provided. As shown in FIG. 11, the computer-implemented method includes automatically retrieving first documents (i.e., textual documents including at least one of identification information and communication and application protocols of first devices) and a second document (i.e., a textual document including at least one of identification information and communication and application protocols of a second device) in an initial operation (1101). The computer-implemented method further includes obtaining first rules of document analytics and machine learning (1102), executing analytic and learning algorithms with respect to text elements of first documents associated with first devices using the first rules (1103) and generating second rules for the first documents (1104). In accordance with embodiments of the present invention, the analytic algorithm can include a document processing algorithm for extracting information from one or more portions of a document and the learning algorithm can include a context processing algorithm for recognizing contextual information of a document. The computer-implemented method also includes re-executing the analytic and learning algorithms with respect to text elements of a second document associated with a second device using the second rules (1105) and identifying identification information and communication and application protocols of a second device from re-execution results (1106).

In accordance with further embodiments of the invention, the computer-implemented method can also include confirming an accuracy of at least one of the identification information and communication and application protocols of the second device (1107), updating the second rules in an event at least one of the identification information and communication and application protocols are unconfirmed (1108) and iteratively repeating the re-executing, the identifying, the confirming and the updating.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for learning device types and device message formats, the computer-implemented method being executable by a processor and comprising:
    obtaining rules of network packet analysis for use with network messages received by the processor from devices using document analytics executed with respect to documents that describe identification information of the devices and that describe communication and application protocols of the devices;
    receiving the network messages from the devices; and
    identifying the identification information of the devices and identifying the communication and application protocols of the network messages received from the devices using the rules of network packet analysis,
    wherein:
    an interface is receptive of first documents that describe the identification information and that describe the communication and application protocols of first ones of the devices at an initial time,
    the interface is receptive of a second document of a second one of the devices at a later time, and the processor is configured to obtain the rules of network packet analysis by:
    obtaining first rules of the document analytics;
    executing analytic and learning algorithms with respect to text elements of the first documents using the first rules of the document analytics;
    automatically generating second rules of the document analytics for the first documents between the initial and later times from results of the executing of the analytic and learning algorithms;
    re-executing the analytic and learning algorithms with respect to text elements of the second document using the second rules of the document analytics; and
    identifying identification information and communication and application protocols of the second one of the devices from re-execution results,
    wherein the identification information and the communication and application protocols facilitate the processor identifying the identification information and the communication and application protocols of the network messages.

2. The computer-implemented method according to claim 1, wherein the document analytics comprise machine learning algorithms.

3. The computer-implemented method according to claim 1, wherein the document analytics comprise a document processing algorithm for extracting information from one or more portions of a document.

4. The computer-implemented method according to claim 1, wherein the document analytics comprise a context processing algorithm for recognizing contextual information of a document.

5. The computer-implemented method according to claim 1, wherein the computer-implemented method further comprises:
    confirming an accuracy of at least one of the identification information and communication and application protocols of the second one of the devices;

updating the second rules when at least one of the identification information and communication and application protocols are unconfirmed; and iteratively repeating the re-executing, the identifying, the confirming and the updating.

6. A computing system for automated learning of a device type and message formats used by a device, the computing system comprising:

an interface, which is receptive of documents, the documents describing identification information of devices and the documents further describing communication and application protocols of the devices;

a processor coupled with the interface, the processor being configured to obtain rules of network packet analysis for use with network messages received by the processor from the devices using document analytics executed with respect to the documents, and the processor being further configured to receive the network messages from the devices and to identify identification information and to identify communication and application protocols of the network messages received from the devices using the rules of network packet analysis, wherein:

the documents are first documents that describe the identification information and that describe the communication and application protocols of first ones of the devices at an initial time, the interface is receptive of a second document of a second one of the devices at a later time, and the processor is configured to obtain the rules of network packet analysis by:

obtaining first rules of the document analytics;

executing analytic and learning algorithms with respect to text elements of the first documents using the first rules of the document analytics;

automatically generating second rules of the document analytics for the first documents between the initial and later times from results of the executing of the analytic and learning algorithms;

re-executing the analytic and learning algorithms with respect to text elements of the second document using the second rules of the document analytics; and identifying identification information and communication and application protocols of the second one of the devices from re-execution results, wherein the identification information and the communication and application protocols facilitate the processor identifying the identification information and the communication and application protocols of the network messages.

7. The computing system according to claim 6, wherein the document analytics comprise machine learning algorithms.

8. The computing system according to claim 6, wherein the document analytics comprise a document processing algorithm for extracting information from one or more portions of a document.

9. The computing system according to claim 6, wherein the document analytics comprise a context processing algorithm for recognizing contextual information of a document.

10. The computing system according to claim 6, wherein the processor is further configured to:

confirm an accuracy of at least one of the identification information and communication and application protocols of the second one of the devices;

update the second rules when at least one of the identification information and the communication and application protocols are unconfirmed; and iteratively repeat the re-executing, the identifying, the confirming and the updating.

11. A computer program product to execute an automatic method for learning device types and device message formats, the computer program product comprising:

a processor; and a memory having executable instructions stored thereon, which are readable and executable by the processor to cause the processor to execute a method comprising:

obtaining rules of network packet analysis for use with network messages received by the processor from devices using document analytics executed with respect to documents that describe identification information of the devices and that describe communication and application protocols of the devices;

receiving the network messages from the devices; and identifying the identification information of the devices and identifying the communication and application protocols of the network messages received from the devices using the rules of network packet analysis, wherein:

an interface is receptive of first documents that describe the identification information and that describe the communication and application protocols of first ones of the devices at an initial time, the interface is receptive of a second document of a second one of the devices at a later time, and the processor is configured to obtain the rules of network packet analysis by:

obtaining first rules of the document analytics;

executing analytic and learning algorithms with respect to text elements of the first documents using the first rules of the document analytics;

automatically generating second rules of the document analytics for the first documents between the initial and later times from results of the executing of the analytic and learning algorithms;

re-executing the analytic and learning algorithms with respect to text elements of the second document using the second rules of the document analytics; and identifying identification information and communication and application protocols of the second one of the devices from re-execution results, wherein the identification information and the communication and application protocols facilitate the processor identifying the identification information and the communication and application protocols of the network messages.

12. The computer program product according to claim 11, wherein the document analytics comprise machine learning algorithms.

13. The computer program product according to claim 11, wherein the document analytics comprise a document processing algorithm for extracting information from one or more portions of a document.

14. The computer program product according to claim 11, wherein the document analytics comprise a context processing algorithm for recognizing contextual information of a document.

* * * * *